(12) United States Patent
Koseoglu et al.

(10) Patent No.: US 11,142,703 B1
(45) Date of Patent: Oct. 12, 2021

(54) FLUID CATALYTIC CRACKING WITH CATALYST SYSTEM CONTAINING MODIFIED BETA ZEOLITE ADDITIVE

(71) Applicants: Saudi Arabian Oil Company, Dhahran (SA); JGC Catalysts and Chemicals, Ltd., Kawasaki (JP); Japan Cooperation Center Petroleum, Tokyo (JP)

(72) Inventors: Omer Refa Koseoglu, Dhahran (SA); Robert Peter Hodgkins, Dhahran (SA); Mitsunori Watabe, Kanagawa (JP); Koji Uchida, Kanagawa (JP)

(73) Assignees: Saudi Arabian Oil Company, Dhahran (SA); JGC Catalysts and Chemicals Ltd., Kawasaki (JP); Japan Cooperation Center Petroleum, Tokyo (JP)

(*) Notice: Subject to any disclaimer, the term of this patent is extended or adjusted under 35 U.S.C. 154(b) by 0 days.

(21) Appl. No.: 16/985,588

(22) Filed: Aug. 5, 2020

(51) Int. Cl.
*C10G 11/05* (2006.01)
*C10G 11/18* (2006.01)
(Continued)

(52) U.S. Cl.
CPC ............. *C10G 11/05* (2013.01); *B01J 29/126* (2013.01); *B01J 29/7007* (2013.01); *B01J 29/74* (2013.01);
(Continued)

(58) Field of Classification Search
CPC ....... C10G 11/02; C10G 11/18; B01J 29/7007
See application file for complete search history.

(56) References Cited

U.S. PATENT DOCUMENTS

| 3,523,914 A | 8/1970 | Mitsche et al. |
| 3,842,138 A | 10/1974 | Chahvekilian et al. |

(Continued)

FOREIGN PATENT DOCUMENTS

| CA | 2041905 A1 | 11/1991 |
| CN | 101134576 A | 3/2008 |

(Continued)

OTHER PUBLICATIONS

International Search Report and Written Opinion dated Apr. 9, 2021 pertaining to International application No. PCT/US2020/060860 filed Nov. 17, 2020, 12 pgs.
(Continued)

*Primary Examiner* — Renee Robinson
(74) *Attorney, Agent, or Firm* — Dinsmore & Shohl LLP (57) ABSTRACT

Methods for cracking a hydrocarbon oil include contacting the hydrocarbon oil with a catalyst system in a fluidized catalytic cracking unit to produce light olefins and gasoline fuel. The catalyst system includes a FCC base catalyst and a catalyst additive. The FCC base catalyst includes a Y-zeolite. The catalyst additive includes a framework-substituted *BEA-type zeolite. The framework-substituted *BEA-type zeolite has a modified *BEA framework. The modified *BEA framework is a *BEA aluminosilicate framework modified by substituting a portion of framework aluminum atoms of the *BEA aluminosilicate framework with beta-zeolite Al-substitution atoms selected from titanium atoms, zirconium atoms, hafnium atoms, and combinations thereof. The FCC base catalyst may include a framework-substituted ultra-stable Y (USY)-zeolite as the Y-zeolite. The framework-substituted USY-zeolite has USY aluminosilicate framework modified by substituting a portion of framework aluminum atoms with titanium atoms, zirconium atoms, hafnium atoms, or combinations thereof.

20 Claims, 2 Drawing Sheets

(51) Int. Cl.
*B01J 29/12* (2006.01)
*B01J 29/74* (2006.01)
*B01J 35/10* (2006.01)
*B01J 29/70* (2006.01)
*C10L 1/06* (2006.01)

(52) U.S. Cl.
CPC ....... *B01J 35/1019* (2013.01); *B01J 35/1023* (2013.01); *B01J 35/1038* (2013.01); *B01J 35/1042* (2013.01); *B01J 35/1061* (2013.01); *B01J 35/1066* (2013.01); *C10G 11/18* (2013.01); *C10G 2300/202* (2013.01); *C10G 2300/308* (2013.01); *C10G 2400/02* (2013.01); *C10G 2400/20* (2013.01); *C10L 1/06* (2013.01); *C10L 2200/0423* (2013.01); *C10L 2270/023* (2013.01)

(56) References Cited

U.S. PATENT DOCUMENTS

| | | | |
|---|---|---|---|
| 3,944,481 A | 3/1976 | Wing et al. | |
| 4,002,556 A | 1/1977 | Satchell | |
| 4,065,379 A | 12/1977 | Soonawala et al. | |
| 4,115,467 A | 9/1978 | Fowler | |
| 4,180,453 A | 12/1979 | Franck et al. | |
| 4,210,560 A | 7/1980 | Kehl | |
| 4,255,288 A | 3/1981 | Cull et al. | |
| 4,419,271 A | 12/1983 | Ward | |
| 4,698,322 A | 10/1987 | Santilli et al. | |
| 4,738,941 A | 4/1988 | Dufresne et al. | |
| 4,798,665 A | 1/1989 | Humbach et al. | |
| 4,826,586 A | 5/1989 | Herbst et al. | |
| 4,859,308 A | 8/1989 | Harandi et al. | |
| 5,057,203 A | 10/1991 | Chu et al. | |
| 5,185,484 A | 2/1993 | Del Rossi et al. | |
| 5,192,421 A | 3/1993 | Audeh et al. | |
| 5,258,117 A | 11/1993 | Kolstad et al. | |
| 5,264,635 A | 11/1993 | Le et al. | |
| 5,271,761 A | 12/1993 | Skeels et al. | |
| 5,414,175 A | 5/1995 | Cook | |
| 5,690,810 A | 11/1997 | Lawrence et al. | |
| 5,906,728 A | 5/1999 | Iaccino et al. | |
| 6,017,840 A | 1/2000 | Wu et al. | |
| 6,063,944 A | 5/2000 | Di Renzo et al. | |
| 6,132,494 A | 10/2000 | Kjos et al. | |
| 6,190,533 B1 | 2/2001 | Bradow et al. | |
| 6,210,561 B1 | 4/2001 | Bradow et al. | |
| 6,303,842 B1 | 10/2001 | Bridges et al. | |
| 6,632,351 B1 | 10/2003 | Ngan et al. | |
| 6,726,834 B2 | 4/2004 | Quesada et al. | |
| 6,762,143 B2 | 7/2004 | Shan et al. | |
| 7,084,087 B2 | 8/2006 | Shan et al. | |
| 7,220,887 B2 | 5/2007 | Stell et al. | |
| 7,331,746 B2 | 2/2008 | Wright et al. | |
| 7,408,093 B2 | 8/2008 | Stell et al. | |
| 7,550,405 B2 | 6/2009 | Shan et al. | |
| 7,700,005 B2 | 4/2010 | Inui et al. | |
| 7,951,745 B2 | 5/2011 | Zhou et al. | |
| 7,972,498 B2 | 7/2011 | Buchanan et al. | |
| 8,002,970 B2 | 8/2011 | Euzen et al. | |
| 8,008,226 B2 | 8/2011 | Inui et al. | |
| 8,070,938 B2 | 12/2011 | Stein et al. | |
| 8,071,833 B2 | 12/2011 | Grootjans et al. | |
| 8,148,285 B2 | 4/2012 | Kuroda et al. | |
| 8,884,088 B2 | 11/2014 | Smith et al. | |
| 9,108,190 B1 | 8/2015 | Fan et al. | |
| 9,221,036 B2 | 12/2015 | Koseoglu et al. | |
| 9,321,704 B2 | 4/2016 | Lattner et al. | |
| 9,499,403 B2 | 11/2016 | Al-Muhaish et al. | |
| 9,512,371 B2 | 12/2016 | Abe et al. | |
| 9,879,187 B2 | 1/2018 | Bhan | |
| 9,908,109 B2 | 3/2018 | Ravishankar et al. | |
| 10,053,401 B1 | 8/2018 | Beadle et al. | |
| 10,081,009 B2 | 9/2018 | Koseoglu et al. | |
| 10,137,442 B2 | 11/2018 | McGuire | |
| 10,293,332 B2 | 5/2019 | Koseoglu et al. | |
| 10,350,585 B1 | 7/2019 | Al-Herz et al. | |
| 10,427,142 B1 | 10/2019 | Al-Herz et al. | |
| 10,494,574 B2 | 12/2019 | Kkah et al. | |
| 10,941,354 B1* | 3/2021 | Hodgkins | C10G 47/20 |
| 2003/0006168 A1 | 1/2003 | Ino et al. | |
| 2004/0004028 A1 | 1/2004 | Stell et al. | |
| 2004/0054247 A1 | 3/2004 | Powers | |
| 2005/0209093 A1* | 9/2005 | Chester | B01J 29/166 |
| | | | 502/65 |
| 2005/0232839 A1* | 10/2005 | Yaluris | C10G 11/182 |
| | | | 423/239.2 |
| 2005/0261530 A1 | 11/2005 | Stell et al. | |
| 2006/0021912 A1 | 2/2006 | Chen et al. | |
| 2007/0090018 A1 | 4/2007 | Keusenkothen et al. | |
| 2007/0090020 A1 | 4/2007 | Buchanan et al. | |
| 2007/0232846 A1 | 10/2007 | Baumgartner et al. | |
| 2009/0283443 A1 | 11/2009 | Kuroda et al. | |
| 2010/0087692 A1 | 4/2010 | Yoshimura et al. | |
| 2011/0042269 A1 | 2/2011 | Kuechler et al. | |
| 2011/0132804 A1 | 6/2011 | Stevenson et al. | |
| 2011/0174682 A1 | 7/2011 | Iaccino | |
| 2011/0247500 A1 | 10/2011 | Akhras et al. | |
| 2011/0251049 A1 | 10/2011 | Kuroda et al. | |
| 2012/0085681 A1 | 4/2012 | Abe et al. | |
| 2013/0046122 A1 | 2/2013 | Vermeiren et al. | |
| 2013/0175202 A1 | 7/2013 | Koseoglu et al. | |
| 2013/0319910 A1 | 12/2013 | Koseoglu et al. | |
| 2015/0111721 A1 | 4/2015 | Tian et al. | |
| 2015/0111722 A1 | 4/2015 | Long et al. | |
| 2015/0375218 A1* | 12/2015 | Koseoglu | C10L 1/06 |
| | | | 208/120.1 |
| 2017/0088490 A1 | 3/2017 | Chen et al. | |
| 2019/0093028 A1 | 3/2019 | Gong et al. | |
| 2019/0316044 A1 | 10/2019 | Koseoglu et al. | |
| 2020/0055025 A1 | 2/2020 | Kukade et al. | |

FOREIGN PATENT DOCUMENTS

| | | |
|---|---|---|
| CN | 101898144 A | 12/2010 |
| CN | 104549543 A | 4/2015 |
| CN | 106140289 A | 11/2016 |
| CN | 106145136 A | 11/2016 |
| EP | 703003 A1 | 3/1996 |
| EP | 2298445 A1 | 3/2011 |
| EP | 3406337 A1 | 11/2018 |
| GB | 1255544 A | 12/1971 |
| GB | 2114594 A | 8/1983 |
| JP | 58098387 A | 6/1983 |
| JP | 07308581 A | 11/1995 |
| JP | 2000334305 A | 12/2000 |
| JP | 2002255537 A | 9/2002 |
| JP | 2003226519 A | 8/2003 |
| WO | 8801254 A1 | 2/1988 |
| WO | 0104237 A2 | 1/2001 |
| WO | 2007047942 A2 | 4/2007 |
| WO | 2009088413 A1 | 7/2009 |
| WO | 2012018819 A1 | 2/2012 |
| WO | 2013057319 A2 | 4/2013 |
| WO | 2013123299 A1 | 8/2013 |
| WO | 2015179735 A1 | 11/2015 |
| WO | 2019147345 A1 | 8/2019 |

OTHER PUBLICATIONS

International Search Report and Written Opinion dated Apr. 13, 2021 pertaining to International application No. PCT/US2020/066520 filed Dec. 22, 2020, 12 pgs.

International Search Report and Written Opinion dated Apr. 21, 2021 pertaining to International application No. PCT/US2020/058208 filed Oct. 30, 2020, 12 pgs.

International Search Report and Written Opinion dated Mar. 17, 2021 pertaining to International application No. PCT/US2020/058682 filed Nov. 3, 2020, 16 pgs.

(56) References Cited

OTHER PUBLICATIONS

International Search Report and Written Opinion dated Mar. 31, 2021 pertaining to International application No. PCT/US2020/057484 filed Oct. 17, 2020, 14 pgs.
International Search Report pertaining to Application No. PCT/US2015/032129 dated Aug. 21, 2015.
Wang et al., "Characterization of titanium-modified USY zeolites and their catalytic performance on n-heptane cracking", Appl Catal A-Gen, vol. 214, No. 2, pp. 167-177, Jun. 29, 2001.
International Search Report pertaining to Application No. PCT/US2013/023337 dated Jun. 18, 2013.
International Search Report pertaining to Application No. PCT/US2018/064001 dated Feb. 18, 2019.
Hamdy et al., "Structural and photocatalytic properties of precious metals modified TiO2-BEA Zeolite composites", Molecular Catalysis, vol. 441, pp. 140-149, 2017.
Rakshe et al., "Acidity and m-Xylene Isomerization Activity of Large Pore, Zirconium-Containing Alumino-silicate with BEA Structure", Journal of Catalysis, vol. 188, pp. 252-260, 1999.
Reddy et al., "A Simple Method for the Preparation of Active Ti Beta Zeolite Catalysts", Catalysisby Microporous Materials, Studies int eh Surface Science and Catalysis, vol. 94, pp. 309-316, 1995.
U.S. Office Action dated Jul. 6, 2021 pertaining to U.S. Appl. No. 16/936,990, filed Jul. 23, 2020, 35 pages.
U.S. Office Action dated Jul. 8, 2021 pertaining to U.S. Appl. No. 16/923,346, filed Jul. 8, 2020, 35 pages.

\* cited by examiner

FLUID CATALYTIC CRACKING WITH CATALYST SYSTEM CONTAINING MODIFIED BETA ZEOLITE ADDITIVE

TECHNICAL FIELD

The present application relates to methods for fluid catalytic cracking of hydrocarbons and, more particularly to methods for fluid catalytic cracking of hydrocarbon feedstocks with catalyst systems containing zeolite catalysts and zeolite catalyst additives.

BACKGROUND

In fluidized catalytic cracking (FCC) processes, petroleum derived hydrocarbons are catalytically cracked with an acidic catalyst maintained in a fluidized state, in which the acidic catalyst is regenerated on a continuous basis. The main product from such processes has generally been gasoline. Other products are also produced in smaller quantities via FCC processes such as liquid petroleum gas and cracked gas oil. Coke deposited on the catalyst is burned off at high temperatures and in the presence of air prior to recycling the regenerated catalyst back to the reaction zone.

Fluid catalytic cracking is the largest refining process used for gasoline production with global capacity of more than 14.2 million barrels per day. The process converts heavy feedstocks such as vacuum distillates, atmospheric residues, and deasphalted oil into lighter products, which are rich in olefins and aromatics. FCC catalyst systems typically include solid acids of fine-particles such as zeolites, aluminum silicate, treated clay (kaolin), bauxite, and silica-alumina.

Additives may be included in FCC catalyst systems to significantly enhance the octane number of gasoline fractions or the yield of light olefins such as propylene. Worldwide demand for propylene is growing continuously. Almost 60% of the total propylene is produced by steam cracking of various hydrocarbon streams such as naphtha, gas oil, and liquid petroleum gas (LPG). Greater than 30% of propylene produced in the world is attained from FCC processes. Therefore, there are ongoing needs for catalyst systems that increase propylene yields generally and for catalyst additives that increase propylene yields in otherwise known catalyst systems.

SUMMARY

Against the foregoing background, example embodiments of this disclosure are directed to methods for cracking a hydrocarbon oil. The methods include contacting the hydrocarbon oil with a catalyst system in a fluidized catalytic cracking unit to produce light olefins and gasoline fuel. The catalyst system includes an FCC base catalyst and a catalyst additive. The FCC base catalyst includes a Y-zeolite. The catalyst additive includes a framework-substituted *BEA-type zeolite. The framework-substituted *BEA-type zeolite has a modified *BEA framework. The modified *BEA framework may be a *BEA aluminosilicate framework that has been modified by substituting a portion of framework aluminum atoms of the *BEA aluminosilicate framework with beta-zeolite Al-substitution atoms independently selected from the group consisting of titanium atoms, zirconium atoms, hafnium atoms, and combinations thereof.

According to some embodiments, the Y-zeolite of the FCC base catalyst may be a framework-substituted ultrastable Y (USY) zeolite. In such embodiments, the framework-substituted USY-zeolite has a modified USY framework. The modified USY framework may be a USY aluminosilicate framework that has been modified by substituting a portion of framework aluminum atoms of the USY aluminosilicate framework with USY-zeolite Al-substitution atoms independently selected from the group consisting of titanium atoms, zirconium atoms, hafnium atoms, and combinations thereof.

These and other features, aspects, and advantages of the present invention will be better understood with reference to the following description and the appended claims.

Additional features and advantages of the embodiments described herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of methods for cracking a hydrocarbon oil. The methods include contacting a hydrocarbon oil with a catalyst system in a fluidized catalytic cracking unit to produce light olefins and gasoline fuel. The catalyst system includes at least a FCC base catalyst and a catalyst additive. The FCC base catalyst includes a Y-zeolite.

The catalyst system of embodiments, including the framework-substituted *BEA-type zeolite catalyst additive and its preparation, will now be described in detail. The incorporation of the catalyst system in the methods for fluidized catalytic cracking of hydrocarbons will be described subsequently.

FCC Base Catalyst

In embodiments of the methods for cracking a hydrocarbon oil, the catalyst system with which the hydrocarbon oil is contacted includes a FCC base catalyst. The FCC base catalyst may be any zeolite catalyst known to be suitable for use in fluidized catalyst cracking processes. A suitable FCC base cracking catalyst may have a bulk density of 0.5 g/mL to 1.0 g/mL, an average particle diameter of 50 μm to 90 μm, a surface area of 50 m$^2$/g to 350 m$^2$/g and a pore volume of 0.05 mL/g to 0.5 mL/g.

In embodiments, the FCC base catalyst is or contains a Y-zeolite. In some embodiments, the Y-zeolite may be an ultra-stable Y (USY) zeolite. In some embodiments, the Y-zeolite may be a modified USY-zeolite such as a framework-substituted USY-type zeolite. The FCC base catalyst including framework-substituted USY-type zeolite has high cracking activity effective for production of light olefins and gasoline with low production of dry gas and coke. The framework-substituted USY-type zeolite will now be described in detail.

A framework-substituted ultra-stable Y (USY)-type zeolite according to embodiments has a modified USY framework. The modified USY framework is an analog to a USY aluminosilicate framework according to the standard definition of a USY aluminosilicate framework. According to the standard definition, USY aluminosilicate framework is that of an aluminosilicate zeolite having a crystal lattice constant (UD) of 2.430 nm or more and 2.460 nm or less, a specific surface area of 600 m$^2$/g to 900 m$^2$/g, and a molar ratio of silicon to aluminum from 5 to 100, as calculated on the basis of silica (Sift) and alumina ($Al_2O_3$).

With regard to the framework-substituted USY-type zeolite according to embodiments of this disclosure, the modified USY framework is a USY aluminosilicate framework modified by substituting a portion of framework aluminum atoms of the USY aluminosilicate framework with USY-zeolite Al-substitution atoms. In embodiments, the USY-zeolite Al-substitution atoms are independently selected from the group consisting of titanium atoms, zirconium atoms, hafnium atoms, and combinations thereof.

As used in this disclosure, the term "Ti-USY" refers to a framework-substituted USY-type zeolite according to embodiments, in which the substitution atoms are titanium. Likewise, the term "Zr-USY" refers to a framework-substituted USY-type zeolite according to embodiments, in which the USY-zeolite Al-substitution atoms include zirconium. The term "Hf-USY" refers to a framework-substituted USY-type zeolite according to embodiments, in which the USY-zeolite Al-substitution atoms include hafnium. The term "(Ti,Zr)-USY" refers to a framework-substituted USY-type zeolite according to embodiments, in which the USY-zeolite Al-substitution atoms include titanium and zirconium. The term "(Ti,Hf)-USY" refers to a framework-substituted USY-type zeolite according to embodiments, in which the USY-zeolite Al-substitution atoms include titanium and hafnium. The term "(Zr,Hf)-USY" refers to a framework-substituted USY-type zeolite according to embodiments, in which the USY-zeolite Al-substitution atoms include zirconium and hafnium. The term "(Ti,Zr,Hf)-USY" refers to a framework-substituted USY-type zeolite according to embodiments, in which the USY-zeolite Al-substitution atoms include titanium, zirconium, and hafnium.

The framework-substituted USY-type zeolite according to embodiments may be Ti-USY, Zr-USY, Hf-USY, (Ti,Zr)-USY, (Ti,Hf)-USY, (Zr,Hf)-USY, or (Ti,Zr,Hf)-USY, as previously defined. The USY-zeolite Al-substitution atoms are substituted for the aluminum atoms forming a framework of the ultra-stable Y-type zeolite and, therefore, serve as constituents of the framework of the ultra-stable Y-type zeolite. Substitution can be verified by analytical techniques including, but not limited to, ultraviolet, visible, and near-infrared spectrophotometry (UV-Vis-NIR), Fourier-transform infrared spectroscopy (FT-IR), or nuclear magnetic resonance spectrometry (NMR).

In some embodiments, the framework-substituted USY-type zeolite includes from 0.01% to 5% by mass, or from 0.1% to 5% by mass, or from 0.2% to 4% by mass, or from 0.3% to 3% by mass USY-zeolite Al-substitution atoms, calculated on an oxide basis, based on the total mass of the framework-substituted USY-type zeolite. In calculations on oxide basis, titanium atoms are calculated on the basis of $TiO_2$, zirconium atoms are calculated on the basis of $ZrO_2$, and hafnium atoms are calculated on the basis of $HfO_2$. Titanium, zirconium, and hafnium in the framework-substituted USY-type zeolites may be quantitatively determined by known techniques, such as by X-ray fluorescence analysis, high-frequency plasma emission spectrometry, or atomic absorption spectrometry, for example.

In some embodiments, in addition to the aluminum-framework-substituted substitution atoms, the framework-substituted USY-type zeolite may further include zirconium atoms, titanium atoms, hafnium atoms, or any combination thereof, attached to, or carried on the outside of, or combined with the framework of the framework-substituted USY-type zeolite. In such embodiments, the zirconium, titanium, or hafnium atoms may be attached as oxide particles such as titania particles, zirconia particles, or hafnia particles. The oxide particles may have particle diameters of 50 nm or less. For the purpose of facilitating quantitative analysis, as contemplated herein, the amounts by mass of substitution atoms in the framework-substituted USY-type zeolite includes the total amount of titanium, zirconium, and hafnium, calculated on an oxide basis and based on the total mass of the framework-substituted USY-type zeolite that is either substituted for framework aluminum atoms or attached to, or carried on the outside of, or combined with the zeolite framework. It should be understood, however, that in all embodiments, at least a portion of the framework aluminum atoms of the USY aluminosilicate framework are substituted with titanium atoms, zirconium atoms, hafnium atoms, or any combination thereof. In example embodiments, greater than 50%, or greater than 75%, or greater than 90%, or greater than 99% of the titanium, zirconium, and hafnium atoms present in the framework-substituted USY-type zeolite are substituted for framework aluminum atoms in the zeolite framework and are not merely attached to, or carried on the outside of, or combined with the zeolite framework, particularly as particles.

It should be appreciated by a person of skill in the art, that when the framework-substituted USY-type zeolite contains a combination of USY-zeolite Al-substitution atoms, as in (Ti,Zr)-USY, (Ti,Hf)-USY, (Zr,Hf)-USY, or (Ti,Zr,Hf)-USY, the mass ratios of the individual types of USY-zeolite Al-substitution atoms in each zeolite, as calculated on an oxide basis, is not restricted. Though the reactions described in the methods according to embodiments may be tuned by adjusting ratios of titanium to zirconium to hafnium, it should be understood that any ratio of titanium to zirconium to hafnium may be effective to carry out the methods for cracking a hydrocarbon oil according to this disclosure.

The framework-substituted USY-type zeolite in the catalyst system may be prepared by any zeolite preparation method that results in a framework-substituted USY-type zeolite that has a USY aluminosilicate framework in which a part of framework aluminum atoms are substituted with titanium atoms, zirconium atoms, hafnium atoms, or any combination thereof. In one example preparation technique, the framework-substituted USY-type zeolite in the catalyst system may be produced by calcining USY-type zeolite at 500° C. to 700° C., the USY-type zeolite having a crystal lattice constant of 2.430 nm to 2.460 nm, a specific surface area of 600 m$^2$/g to 900 m$^2$/g, and a molar ratio of silica to alumina of 5 to 100. Then, a suspension is formed containing the fired USY-type zeolite. The suspension may have a liquid/solid mass ratio of 5 to 15. An inorganic acid or an organic acid is added to the suspension to decrease the pH of the suspension to less than 2.0. The pH of the suspension is controlled in advance to less than 2.0 to prevent precipitation during mixing of one or more additional solutions.

Specifically, one or more additional solutions containing a compound of zirconium, titanium, hafnium, or combinations thereof is mixed into the suspension to cause framework substitution at aluminum sites. The suspension then is neutralized with a base such as aqueous ammonia, for example, to increase the pH to a range from 7 to 7.5. The resulting framework-substituted USY-type zeolite may be filtered, washed with water, and dried at a drying temperature from 80° C. to 180° C., for example.

In the preparation of the framework-substituted USY-type zeolite, the ultra-stable Y-type zeolite raw material may be calcined at 500° C. to 700° C. or 550° C. to 650° C. The calcining time is not specifically limited, as long as the framework-substituted USY-type zeolite is obtained. Example calcining times may be from 30 minutes to 10 hours. In respect to a calcining atmosphere of the USY-type zeolite raw material, the calcining is carried out preferably in the air. The calcined USY-type zeolite raw material is suspended in water having a temperature of from 20° C. to 30° C. to form a suspension. With respect to the concentration of the suspension of the USY-type zeolite, the liquid/solid mass ratio may be from 5 to 15, or from 8 to 12, for example.

Non-limiting examples of inorganic acids for decreasing the pH of the suspension in the preparation of the framework-substituted USY-type zeolite may include sulfuric acid, nitric acid, or hydrochloric acid. Examples of organic acids for decreasing the pH of the suspension in the preparation of the framework-substituted USY-type zeolite may include carboxylic acids. Amounts of the inorganic acid or the organic acid are not limited, as long as a pH of the suspension can be controlled to a range of less than 2.0. Non-limiting example amounts of acid include molar amounts of acid from 0.5 to 4.0 times, or from 0.7 to 3.5 times the molar amount of alumina in the framework-substituted USY-type zeolite.

Non-limiting examples of the titanium compound present in the additional solution mixed into the suspension during preparation of the framework-substituted USY-type zeolite include titanium sulfate, titanium acetate, titanium chloride, titanium nitrate, titanium lactate, and any compound of titanium having sufficient solubility in the suspension to cause titanium atoms to replace aluminum atoms in the zeolite framework. In embodiments, an aqueous solution of a titanium compound prepared by dissolving the titanium compound in water is suitably used as the titanium compound.

Non-limiting examples of the zirconium compound present in the additional solution mixed into the suspension during preparation of the framework-substituted USY-type zeolite include zirconium sulfate, zirconium nitrate, zirconium chloride, and any compound of zirconium having sufficient solubility in the suspension to cause zirconium atoms to replace aluminum atoms in the zeolite framework. In embodiments, an aqueous solution of a zirconium compound prepared by dissolving the zirconium compound in water is suitably used as the zirconium compound.

Non-limiting examples of the hafnium compound present in the additional solution mixed into the suspension during preparation of the framework-substituted USY-type zeolite include hafnium chloride, hafnium nitrate, hafnium fluoride, hafnium bromide, hafnium oxalate, and any compound of hafnium having sufficient solubility in the suspension to cause hafnium atoms to replace aluminum atoms in the zeolite framework. In embodiments, an aqueous solution of a hafnium compound prepared by dissolving the hafnium compound in water is suitably used as the hafnium compound.

In the preparation of the framework-substituted USY-type zeolite, when mixing an aqueous solution of the zirconium compound, the hafnium compound, or the titanium compound with the suspension of the ultra-stable Y-type zeolite, the aqueous solution may be gradually added to the suspension. After the addition of the aqueous solution to the suspension is completed, the solution may be mixed by stirring at, for example, room temperature (25° C.±10° C.) for 3 hours to 5 hours. Further, after the mixing is completed, the mixed solution described above is neutralized by adding an alkali such as aqueous ammonia so that a pH thereof is controlled to 7.0 to 7.5, whereby the framework-substituted zeolite in the catalyst can be obtained.

Catalyst Additive

In embodiments of the methods for cracking a hydrocarbon oil, in addition to the FCC base catalyst, the catalyst system with which the hydrocarbon oil is contacted includes a catalyst additive. The catalyst additive includes a framework-substituted *BEA-type zeolite. The framework-substituted *BEA-type zeolite has a modified *BEA framework.

The modified *BEA framework is an analog to a *BEA aluminosilicate framework according to the standard definition of a *BEA aluminosilicate framework. According to the standard definition, a *BEA aluminosilicate framework is that a crystalline aluminosilicate zeolite having a crystal lattice constants a and b (UD) from 1.260 nm to 1.270 nm, a unit cell length c from 2.62 nm to 2.65 nm, a specific surface area of 400 $m^2$/g to 800 $m^2$/g, and a molar ratio of silicon to aluminum from 10 to 200, as calculated on the basis of silica ($SiO_2$) and alumina ($Al_2O_3$).

With regard to the framework-substituted *BEA-type zeolite according to embodiments of this disclosure, the modified *BEA aluminosilicate framework is a *BEA aluminosilicate framework modified by substituting a portion of framework aluminum atoms of the *BEA aluminosilicate framework with beta-zeolite Al-substitution atoms independently selected from the group consisting of titanium atoms, zirconium atoms, and hafnium atoms, and combinations thereof.

As used in this disclosure, the term "Ti-*BEA" refers to a framework-substituted *BEA-type zeolite according to embodiments, in which the substitution atoms are titanium. Likewise, the term "Zr-*BEA" refers to a framework-substituted *BEA-type zeolite according to embodiments, in which the beta-zeolite Al-substitution atoms include zirconium. The term "Hf-*BEA" refers to a framework-substituted *BEA-type zeolite according to embodiments, in which the beta-zeolite Al-substitution atoms include hafnium. The term "(Ti,Zr)-*BEA" refers to a framework-substituted *BEA-type zeolite according to embodiments, in which the beta-zeolite Al-substitution atoms include titanium and zirconium. The term "(Ti,Hf)-*BEA" refers to a framework-substituted *BEA-type zeolite according to embodiments, in which the beta-zeolite Al-substitution atoms include titanium and hafnium. The term "(Zr,Hf)-*BEA" refers to a framework-substituted *BEA-type zeolite according to embodiments, in which the beta-zeolite Al-substitution atoms include zirconium and hafnium. The term "(Ti,Zr,Hf)-*BEA" refers to a framework-substituted *BEA-type zeolite according to embodiments, in which the beta-zeolite Al-substitution atoms include titanium, zirconium, and hafnium.

The framework-substituted *BEA-type zeolite according to embodiments may be Ti-*BEA, Zr-*BEA, Hf-*BEA, (Ti,Zr)-*BEA, (Ti,Hf)-*BEA, (Zr,Hf)-*BEA, or (Ti,Zr,Hf)-*BEA, as previously defined. The beta-zeolite Al-substitution atoms are substituted for the aluminum atoms forming a framework of the *BEA-type zeolite and, therefore, serve as constituents of the framework of the *BEA-type zeolite. Substitution can be verified by analytical techniques including, but not limited to, ultraviolet, visible, and near-infrared spectrophotometry (UV-Vis-NIR), Fourier-transform infrared spectroscopy (FT-IR), or nuclear magnetic resonance spectrometry (NMR).

In some embodiments, the framework-substituted *BEA-type zeolite includes from 0.01% to 5% by mass, or from 0.1% to 5% by mass, or from 0.2% to 4% by mass, or from 0.3% to 3% by mass beta-zeolite Al-substitution atoms, calculated on an oxide basis, based on the total mass of the framework-substituted *BEA-type zeolite. In calculations on oxide basis, titanium atoms are calculated on the basis of $TiO_2$, zirconium atoms are calculated on the basis of $ZrO_2$, and hafnium atoms are calculated on the basis of $HfO_2$. Titanium, zirconium, and hafnium in the framework-substituted *BEA-type zeolites may be quantitatively determined by known techniques, such as by X-ray fluorescence analysis, high-frequency plasma emission spectrometry, or atomic absorption spectrometry, for example.

In some embodiments, in addition to the aluminum-framework-substituted beta-zeolite Al-substitution atoms, the framework-substituted *BEA-type zeolite may further include zirconium atoms, titanium atoms, hafnium atoms, or any combination thereof, attached to, or carried on the outside of, or combined with the framework of the framework-substituted *BEA-type zeolite. In such embodiments, the zirconium, titanium, or hafnium atoms may be attached as oxide particles such as titania particles, zirconia particles, or hafnia particles. The oxide particles may have particle diameters of 50 nm or less. For the purpose of facilitating quantitative analysis, as contemplated herein, the amounts by mass of substitution atoms in the framework-substituted *BEA-type zeolite includes the total amount of titanium, zirconium, and hafnium, calculated on an oxide basis and based on the total mass of the framework-substituted *BEA-type zeolite that is either substituted for framework aluminum atoms or attached to, or carried on the outside of, or combined with the zeolite framework. It should be understood, however, that in all embodiments, at least a portion of the framework aluminum atoms of the *BEA aluminosilicate framework are substituted with titanium atoms, zirconium atoms, hafnium atoms, or any combination thereof. In example embodiments, greater than 50%, or greater than 75%, or greater than 90%, or greater than 99% of the titanium, zirconium, and hafnium atoms present in the framework-substituted *BEA-type zeolite are substituted for framework aluminum atoms in the zeolite framework and are not merely attached to, or carried on the outside of, or combined with the zeolite framework, particularly as particles.

It is appreciated by a person of skill in the art, that when the framework-substituted *BEA-type zeolite contains a combination of beta-zeolite Al-substitution atoms, as in (Ti,Zr)-*BEA, (Ti,Hf)-*BEA, (Zr,Hf)-*BEA, or (Ti,Zr,Hf)-*BEA, the mass ratios of the individual types of beta-zeolite Al-substitution atoms in each zeolite, as calculated on an oxide basis, is not restricted. Though the reactions described in the methods according to embodiments may be tuned by adjusting ratios of titanium to zirconium to hafnium, it should be understood that any ratio of titanium to zirconium to hafnium may be effective to carry out the methods for cracking a hydrocarbon oil according to this disclosure.

The framework-substituted *BEA-type zeolite in the catalyst system may be prepared by any zeolite preparation method that results in a framework-substituted *BEA-type zeolite that has a *BEA aluminosilicate framework in which a part of framework aluminum atoms are substituted with titanium atoms, zirconium atoms, hafnium atoms, or any combination thereof. In one example preparation technique, the framework-substituted *BEA-type zeolite in the catalyst system is produced by firing a *BEA-type zeolite at 500° C. to 700° C., the *BEA-type zeolite having a crystal lattice constants a and b from 1.260 nm to 1.270 nm, a unit-cell length c from 2.62 nm to 2.65 nm, a specific surface area of 400 $m^2$/g to 800 $m^2$/g, and a molar ratio of silica to alumina of 10 to 200, or from 10 to 100, or from 30 to 70. Then, a suspension is formed containing the fired *BEA-type zeolite. The suspension may have a liquid/solid mass ratio of 5 to 15, based on the liquids and solids present in the suspension. An inorganic acid or an organic acid is added to the suspension to decrease the pH of the suspension to less than 2.0. The pH of the suspension is controlled in advance to less than 2.0 to prevent precipitation during mixing of one or more additional solutions. Specifically, one or more additional solutions containing a compound of zirconium, titanium, hafnium, or combinations thereof is mixed into the suspension to cause framework substitution at aluminum sites. The suspension then is neutralized with a base such as aqueous ammonia, for example, to increase the pH to a range from 7 to 7.5. The resulting framework-substituted *BEA-type zeolite may be filtered, washed with water, and dried at a drying temperature from 80° C. to 180° C., for example.

In one specific and non-limiting example preparation of a (Ti,Zr)-*BEA framework-substituted *BEA-type zeolite according to embodiments, 51.4 g of a zeolite having a *BEA framework with a silica to alumina ratio of 28.5 is suspended in 450 g of deionized water, and heated to 40° C. Then, 14.8 g of $H_2SO_4$ (25 wt. %) is added, together with 10.0 g of an aqueous solution of titanium sulfate (equivalent to 5 wt. % $TiO_2$) prepared by adding 1.52 g titanium sulfate to 8.48 g deionized water (equivalent to 33 wt. % $TiO_2$ in the aqueous solution). To the solution is added an additional aqueous zirconium sulfate solution (2.8 g, constituting 18 wt. % $ZrO_2$). The mixture is stirred for 4 hours at 60° C., then filtered and washed with 1.5 liters of deionized water. The resulting zeolite is dried at 110° C. to yield a framework substituted zeolite (Ti,Zr)-*BEA.

In the preparation of the framework-substituted *BEA-type zeolite, when mixing an aqueous solution of the zirconium compound, the hafnium compound, or the titanium compound with the suspension of the *BEA-type zeolite, the aqueous solution may be gradually added to the suspension. After the addition of the aqueous solution to the suspension is completed, the solution may be mixed by stirring at, for example, room temperature (25° C.±10° C.) for 3 hours to 5 hours. Further, after the mixing is completed, the mixed solution described above is neutralized by adding an alkali such as aqueous ammonia so that a pH thereof is controlled to 7.0 to 7.5, whereby the framework-substituted zeolite in the catalyst can be obtained.

In the preparation of the framework-substituted *BEA-type zeolite, the *BEA-type zeolite raw material may be calcined at 500° C. to 700° C. or 550° C. to 650° C. The calcining time is not specifically limited, as long as the framework-substituted *BEA-type zeolite is obtained. Example calcining times may be from 30 minutes to 10 hours. In respect to a calcining atmosphere of the *BEA-type zeolite raw material, it is carried out preferably in the air. The calcined *BEA-type zeolite raw material is suspended in water having a temperature of from 20° C. to 30° C. to form a suspension. With respect to the concentration of the suspension of the *BEA-type zeolite, the liquid/solid mass ratio may be from 5 to 15, or from 8 to 12, for example.

Non-limiting examples of inorganic acids for decreasing the pH of the suspension in the preparation of the framework-substituted *BEA-type zeolite may include sulfuric acid, nitric acid, or hydrochloric acid. Examples of organic acids for decreasing the pH of the suspension in the preparation of the framework-substituted *BEA-type zeolite may include carboxylic acids. Amounts of the inorganic acid or the organic acid are not limited, as long as a pH of the suspension can be controlled to a range of less than 2.0. Non-limiting example amounts of acid include molar amounts of acid from 0.5 to 4.0 times, or from 0.7 to 3.5 times the molar amount of alumina in the framework-substituted *BEA-type zeolite.

Non-limiting examples of the titanium compound present in the additional solution mixed into the suspension during preparation of the framework-substituted *BEA-type zeolite include titanium sulfate, titanium acetate, titanium chloride, titanium nitrate, titanium lactate, and any compound of titanium having sufficient solubility in the suspension to cause titanium atoms to replace aluminum atoms in the zeolite framework. In embodiments, an aqueous solution of a titanium compound prepared by dissolving the titanium compound in water is suitably used as the titanium compound.

Non-limiting examples of the zirconium compound present in the additional solution mixed into the suspension during preparation of the framework-substituted *BEA-type zeolite include zirconium sulfate, zirconium nitrate, zirconium chloride, and any compound of zirconium having sufficient solubility in the suspension to cause zirconium atoms to replace aluminum atoms in the zeolite framework. In embodiments, an aqueous solution of a zirconium compound prepared by dissolving the zirconium compound in water is suitably used as the zirconium compound.

Non-limiting examples of the hafnium compound present in the additional solution mixed into the suspension during preparation of the framework-substituted *BEA-type zeolite include hafnium chloride, hafnium nitrate, hafnium fluoride, hafnium bromide, hafnium oxalate, and any compound of hafnium having sufficient solubility in the suspension to cause hafnium atoms to replace aluminum atoms in the zeolite framework. In embodiments, an aqueous solution of a hafnium compound prepared by dissolving the hafnium compound in water is suitably used as the hafnium compound.

According to embodiments, the framework-substituted *BEA-type zeolite catalyst additive may have (a) a specific surface area of 400 m$^2$/g to 800 m$^2$/g; (b) a molar ratio of SiO$_2$ to Al$_2$O$_3$ from 10 to 200; (c) a pore volume from 0.2 cm$^3$/g to 0.6 cm$^3$/g; and (d) crystal lattice constants a=1.26 nm to 1.27 nm, b=1.26 nm to 1.27 nm, and c=2.62 to 2.65 nm. The catalyst additive including the framework-substituted *BEA-type zeolite may have a volume of pores having a diameter of 600 angstroms or less (60 nm or less) from 0.40 mL/g to 0.75 mL/g. In a non-limiting example embodiment, the framework-substituted *BEA-type zeolite catalyst additive may include a (Ti,Zr)-*BEA zeolite having (a) a specific surface area of 400 m$^2$/g to 800 m$^2$/g; (b) a molar ratio of SiO$_2$ to Al$_2$O$_3$ of about 60; (c) a pore volume from 0.38 cm$^3$/g to 0.43 cm$^3$/g; and (d) crystal lattice constants a=1.26 nm to 1.27 nm, b=1.26 nm to 1.27 nm, and c=2.62 to 2.65 nm. The *BEA-type zeolite catalyst additive may have mesopores having diameters from 2 nm to 100 nm.

According to embodiments of the methods for cracking a hydrocarbon oil, the catalyst system may include the FCC base catalyst and the catalyst additive in a weight ratio of FCC base catalyst to catalyst additive from 2:1 to 1000:1, or from 2:1 to 100:1, or from 4:1 to 100:1, or from 6:1 to 20:1, or about 9:1, based on the combined weight of the FCC base catalyst and the catalyst additive.

In non-limiting example embodiments of the methods for cracking a hydrocarbon oil, catalyst additive is a (Ti, Zr)-*BEA framework-substituted *BEA-type zeolite containing from 0.01% to 5% beta-zeolite Al-substitution atoms, as calculated on an oxide basis, based on the total mass of the framework-substituted *BEA-type zeolite; the beta-zeolite Al-substitution atoms include titanium atoms and zirconium atoms; the FCC base catalyst is a (Ti,Zr)-USY framework-substituted ultra-stable Y-zeolite containing from 0.01% to 5% USY-zeolite Al-substitution atoms, as calculated on an oxide basis, based on the total mass of the framework-substituted ultra-stable Y-zeolite; and the USY-zeolite Al-substitution atoms include titanium atoms and zirconium atoms.

Optional Components of Catalyst System

In embodiments of the methods for cracking a hydrocarbon oil, in addition to the FCC base catalyst and the catalyst additive, the catalyst system with which the hydrocarbon oil is contacted optionally may further include one or more of a catalyst matrix support, a binder, a filler, and an active metal component.

The catalyst system of the methods according to embodiments may further include a support for the FCC base catalyst and the framework-substituted *BEA-type zeolite catalyst additive. In some embodiments, the support may include an inorganic oxide excluding either or both of the FCC base catalyst and the framework-substituted *BEA-type zeolite catalyst additive. The inorganic oxide of the support may further include a substance serving as a granulating agent or a binder. Any substance that is contained in any known zeolite catalyst matrix support including as a granulating agent may be used. Examples of such inorganic oxides include, but are not limited to alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia. In example embodiments, the catalyst system includes as a support an inorganic oxide chosen from alumina and silica-alumina. Silica-alumina supports may be amorphous.

In embodiments for which the catalyst system includes a catalyst matrix support, the weight ratios of the zeolites and the catalyst matrix support may vary according to the desired level of catalyst activity. In example embodiments, the mass of catalyst matrix support in the catalyst system is determined relative to the mass of zeolites in the catalyst system, without regard to other components of the catalyst system. In example embodiments, the catalyst system may include from 10% to 80% by mass, from 20% to 70% by mass, or from 25% to about 65% by mass zeolites based on the total mass of all zeolites in the catalyst system. Likewise, the catalyst system may include a catalyst matrix support composing from 20% to 90% by mass, or from 30% to 80% by mass, or from 35% to 75% by mass of the catalyst system, based on the total mass of the catalyst system.

In further example embodiments, the catalyst system may include a binder such as a silica-based binder or an alumina-based binder. The silica based binder and alumina based binder can be used as inorganic binder. The silica based binder can be any one of or two or more of silica sol, water glass (sodium silicate), and silicic acid liquid. For example, silica sol comprising $SiO_2$ at a concentration in the range of 10% to 15% by mass can be prepared by adding water glass comprising $SiO_2$ at a concentration in the range of 12% to 23% by mass and sulfuric acid having a concentration in the range of 20% to 30% by mass simultaneously and continuously. Aluminum-compound binder can be (a) basic aluminum chloride, (b) aluminum biphosphate, or (c) alumina sol. A solution obtained by dissolving any kind of or two or more kinds of crystallite alumina, such as gibbsite, bayerrite, and boehmite, in an acid solution may be used as the aluminum-compound binder instead. Here, basic aluminum chloride is expressed as $[Al_2(OH)_nCl_{6-n}]_m$, where n is an integer and m is a natural number, and where $0<n<6$ and $1<m<10$, or, in some embodiments, where $4.8<n<5.3$ and $3<m<7$.

The catalyst system of the methods according to embodiments may further include active metal components selected from individual metals or combinations of metals from IUPAC Groups 7 to 11 of the Periodic Table. Examples of active metals include iron, cobalt, nickel, rhodium, palladium, silver, iridium, platinum, gold, chromium, molybdenum, and tungsten. Non-limiting examples of combinations of metal components include combinations of molybdenum and tungsten; combinations of cobalt and nickel; and combinations of any one or more of molybdenum, tungsten, cobalt, or nickel with a platinum-group metal such as platinum, rhodium, or palladium. In example embodiments, the catalyst system may include at least one active-phase metal chosen from nickel, molybdenum, tungsten, platinum, palladium, and combinations thereof. Without intent to be bound by theory, it is believed that the framework substitution of titanium, zirconium, or hafnium for aluminum in the framework-substituted USY-type zeolite according to embodiments may facilitate a greater amount of active-metal distribution on surfaces of the zeolite catalyst.

When an active metal component is included in the catalyst system, the catalyst system may contain from greater than zero to about 40% by mass metal component, calculated on an oxide basis for oxide components or on a metal basis for metals, based on the total mass of the catalyst system. In example embodiments, the catalyst system may include from 3% to 30% by mass of a metal component such as iron, cobalt, nickel, rhodium, palladium, silver, iridium, platinum, gold, chromium, molybdenum, or tungsten, calculated on an oxide basis, based on the total mass of the catalyst system. In further example embodiments, the catalyst system may include from 0.01% to 2% by mass of a metal component chosen from platinum, rhodium, or palladium, calculated on a metal basis, based on the total mass of the catalyst system.

The catalyst system of the methods according to embodiments may further include additional FCC catalysts as additives, in addition to the FCC base catalyst and the framework-substituted *BEA-type zeolite catalyst additive. Examples of such additional FCC catalysts may include shape-selective zeolites having a pore diameter smaller than that of Y-type zeolite and thereby are selective to permitting hydrocarbons with only limited shapes to enter the zeolite through its pores. Examples of suitable shape-selective zeolite components include ZSM-5 zeolite, zeolite omega, SAPO-5 zeolite, SAPO-11 zeolite, SAPO-34 zeolite, and pentasil-type aluminosilicates, for example. When present in the catalyst system, the content of the additional shape-selective zeolite in the catalyst system may be from 0.01 wt. % to 30 wt. %, or from about 0.01 wt. % to 20 wt. %, based on the total weight of the catalyst system.

In non-limiting example embodiments, in the methods for cracking a hydrocarbon oil, the catalyst system may include the FCC base catalyst, the catalyst additive, a catalyst matrix support, a binder, and a filler. In such example embodiments, the catalyst matrix support may include alumina or silica-alumina; the binder may be a sol of a porous inorganic oxide selected from the group consisting of alumina, silica, boria, chromia, magnesia, zirconia, titania, silica-alumina, and combinations thereof; and the filler may be a clay selected from the group consisting of kaolin, montmorillonite, halloysite, bentonite, and combinations thereof. In a non-limiting example, the catalyst system may include, based on the total weight of the catalyst system: from 1% to 50% by weight FCC base catalyst; from 1% to 50% by weight catalyst additive; from 0.1% to 15% by weight binder; and from 0.1% to 15% by weight clay. In a further non-limiting example, the catalyst system may include, based on the total weight of the catalyst system: from 1% to 50% by weight FCC base catalyst; from 1% to 50% by weight catalyst additive; from 0.1% to 15% by weight binder; and from 0.1% to 15% by weight clay, and a weight ratio of the FCC base catalyst to catalyst additive in the catalyst system may be from 6:1 to 20:1, based on the combined weight of the FCC base catalyst and the catalyst additive.

Fluidized Catalytic Cracking Process

In the methods for cracking a hydrocarbon oil, the hydrocarbon oil is contacted with the catalyst system, as previously described, in a fluidized catalytic cracking unit to produce light olefins and gasoline fuel. The cracking method including the catalyst system as an integral component will now be described in detail.

In certain embodiments of the method, a hydrocarbon oil mixture is provided having a boiling point range greater than 350° C. and the reactor is operated at reaction temperature range of 450° C. to 700° C., a pressure of 1 bar to 10 bar, a residence or contact time of about 0.1 seconds to about 60 seconds, and a catalyst-to-oil weight ratio of about 2:1 to about 30:1. The fluidized catalytic cracking can be operated under conditions effective to maximize production of gasoline and light olefins, and/or under conditions effective to maximize production of light olefins.

As used herein, "heavy hydrocarbons" refer to petroleum fractions having a nominal boiling point greater than 350° C., including common refinery streams such as vacuum gas oil (VGO), hydrocracking unit unconverted bottoms or recycle oil, deasphalted oil (DAO) obtained from a solvent deasphalting process, demetallized oil, light or heavy coker gas oil obtained from a coker process, cycle oil obtained from a separate fluidized catalytic cracking process or recycled from an FCC process using the present catalyst, gas oil obtained from a visbreaking process, or combinations comprising at least one of the foregoing sources or hydrogenated derivatives of the oils.

According to some embodiments, the fluidized catalytic cracking unit may include a riser reactor or a downer reactor. As used in this disclosure, the term "downer" refers to a reactor, such as a fluidized bed reactor, where the reactant flows in a generally downward direction such as, for example, entering the top and exiting the bottom of the reactor. Likewise, the term "riser" refers to a reactor, such as a fluidized bed reactor, where the reactant flows in a generally upward direction such as, for example, entering the bottom and exiting the top of the reactor.

A catalyst system that is suitable for the particular charge and the desired product may be conveyed to the fluidized catalytic cracking reactor or reactors. In certain embodiments, to promote formation of olefins including, but not limited to, propylene, and to minimize olefin-consuming reactions, such as hydrogen-transfer reactions, an FCC catalyst mixture is used in the FCC unit, including an FCC base catalyst and an FCC catalyst additive.

Fluid catalytic cracking based on a catalyst for fluid catalytic cracking according to the present invention can be performed under ordinary conditions for fluid catalytic cracking of hydrocarbon oil. For example, the conditions described below can be suitably used. The catalyst system as previously described may be charged into a reactor vessel and suitably used for catalytic cracking of hydrocarbon oil according to known FCC processes for production of gasoline and/or light olefins including ethylene, propylene and butylenes.

In the fluidized catalytic cracking, the hydrocarbon oil may be derived from one or more of crude oil, synthetic crude oil, bitumen, oil sand, shale oil and coal liquid. These feeds can include petroleum fractions having a normal point greater than 350° C., including naphtha, diesel, vacuum gas oil (VGO), deasphalted oil (DAO) obtained from a solvent deasphalting process, demetallized oil, light or heavy coker gas oil obtained from a coker process, cycle oil obtained from a separate fluidized catalytic cracking process or recycled from an FCC process using the present catalyst, gas oil obtained from a visbreaking process, or combinations comprising at least one of the foregoing.

For example, a catalytic cracking apparatus is charged with the FCC catalyst described above, and hydrocarbon oil having a boiling point greater than 350° C., in certain embodiments in the from about 350° C. to about 850° C., can be cracked using fluidized catalytic cracking at a reaction temperature from about 450° C. to about 700° C., a pressure of 1 bar to 10 bar, a residence or contact time in the range of about 0.1 seconds to about 60 seconds, and a catalyst-to-oil weight ratio in the range of about 2:1 to about 30:1.

Figure 1:
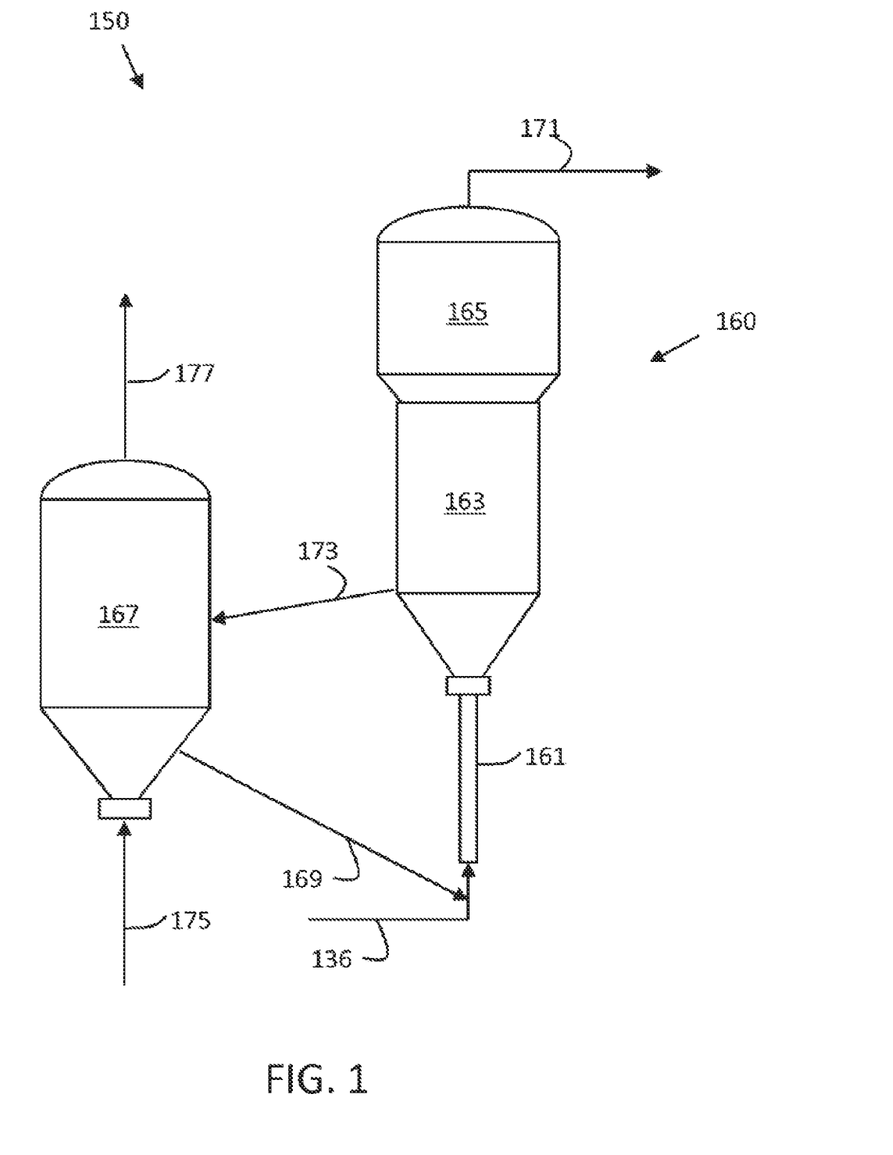
FIG. 1 is a schematic diagram of a riser fluidic catalytic cracking unit.

In certain embodiments, a fluidized catalytic cracking unit configured with a riser reactor is provided that operates under conditions that promote formation of light olefins, particularly propylene, and that minimize light olefin-consuming reactions including hydrogen-transfer reactions. FIG. 1 is a simplified schematic illustration of a riser fluidized catalytic cracking unit. A fluidized catalytic cracking unit 150 includes a riser reactor. Fluidized catalytic cracking unit 150 includes a reactor/separator 160 having a riser portion 161, a reaction zone 163 and a separation zone 165. Fluidized catalytic cracking unit 150 also includes a regeneration vessel 167 for regenerating spent catalyst. A charge 136 is introduced to the reaction zone, in certain embodiments accompanied by steam or other suitable gas for atomization of the feed (not shown). The charge 136 is admixed and intimately contacted with an effective quantity of heated fresh or regenerated solid cracking catalyst particles that are conveyed via a conduit 169 from regeneration vessel 167. The feed mixture and the cracking catalyst are contacted under conditions to form a suspension that is introduced into the riser 161. In a continuous process, the mixture of cracking catalyst and hydrocarbon feedstock proceed upward through the riser 161 into reaction zone 163. In riser 161 and reaction zone 163, the hot cracking catalyst particles catalytically crack relatively large hydrocarbon molecules by carbon-carbon bond cleavage.

During the reaction, as is conventional in fluidized catalytic cracking operations, the cracking catalysts become coked and hence access to the active catalytic sites is limited or nonexistent. Reaction products are separated from the coked catalyst using any suitable configuration known in a fluidized catalytic cracking unit, generally referred to as the separation zone 165 in a fluidized catalytic cracking unit 150, for instance, located at the top of the reactor 160 above the reaction zone 163. The separation zone can include any suitable apparatus known to those of ordinary skill in the art such as, for example, cyclones. The reaction product is withdrawn through conduit 171. Catalyst particles containing coke deposits from fluid cracking of the hydrocarbon feedstock pass through a conduit 173 to regeneration zone 167. According to the process herein, since the light solvent feedstock is combined with the heavy feedstock as the feed 136, the solvent to oil ratio in the initial solvent deasphalting/demetallizing process is selected so as to provide sufficient coking of the catalyst to provide the heat balance during regeneration.

In regeneration zone 167, the coked catalyst comes into contact with a stream of oxygen-containing gas, e.g., pure oxygen or air, which enters regeneration zone 167 via a conduit 175. The regeneration zone 167 is operated in a configuration and under conditions that are known in typical a fluidized catalytic cracking operations. For instance, regeneration zone 167 can operate as a fluidized bed to produce regeneration off-gas comprising combustion products which is discharged through a conduit 177. The hot regenerated catalyst is transferred from regeneration zone 167 through conduit 169 to the bottom portion of the riser 161 for admixture with the hydrocarbon feedstock and noted above.

In general, the operating conditions for the reactor of a suitable riser fluidized catalytic cracking unit using the catalysts herein include: reaction temperature of about 480° C. to about 650° C., in certain embodiments about 500° C. to about 620° C., and in further embodiments about 500° C. to about 600° C.; a reaction pressure of about 1 kg/cm$^2$ to about 20 kg/cm$^2$, in certain embodiments of about 1 kg/cm$^2$ to about 10 kg/cm$^2$, in further embodiments of about 1 kg/cm$^2$ to about 3 kg/cm$^2$; a contact time (in the reactor) of about 0.5 seconds to about 10 seconds, in certain embodiments of about 1 second to about 5 seconds, in further embodiments of about 1 second to about 2 seconds; and a catalyst to feed ratio of about 1:1 to about 15:1, in certain embodiments of about 1:1 to about 10:1, in further embodiments of about 8:1 to about 20:1.

Figure 2:
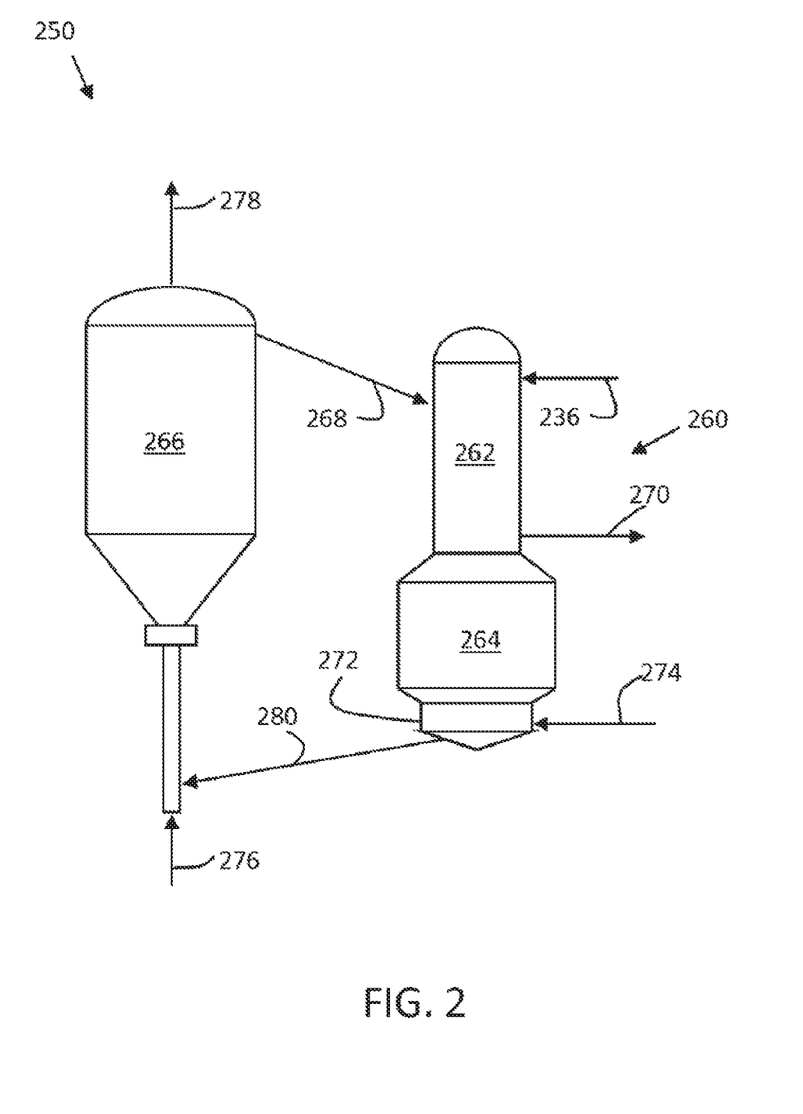
FIG. 2 is a schematic diagram of a downflow fluidic catalytic cracking unit.

In certain embodiments, a fluidized catalytic cracking unit configured with a downflow reactor is provided that operates under conditions that promote formation of light olefins, particularly propylene, and that minimize light olefin-consuming reactions including hydrogen-transfer reactions. FIG. 2 is a simplified schematic illustration of a downflow fluidized catalytic cracking unit. A fluidized catalytic cracking unit 250 includes a reactor/separator 260 having a reaction zone 262 and a separation zone 264. Fluidized catalytic cracking unit 250 also includes a regeneration zone 266 for regenerating spent catalyst. In particular, a charge 236 is introduced to the reaction zone, in certain embodiments accompanied by steam or other suitable gas for atomization of the feed (not shown). An effective quantity of heated fresh or hot regenerated solid cracking catalyst particles from regeneration zone 266 is conveyed to the top of reaction zone 262 also transferred, e.g., through a downwardly directed conduit or pipe 268, commonly referred to as a transfer line or standpipe, to a withdrawal well or hopper (not shown) at the top of reaction zone 262. Hot catalyst flow is typically allowed to stabilize in order to be uniformly directed into the mix zone or feed injection portion of reaction zone 262. The charge 236 is injected into a mixing zone through feed injection nozzles typically situated proximate to the point of introduction of the regenerated catalyst into reaction zone 262. These multiple injection nozzles result in the catalyst and oil mixing thoroughly and uniformly. Once the charge contacts the hot catalyst, cracking reactions occur.

The reaction vapor of hydrocarbon cracked products, unreacted feed, and catalyst mixture quickly flows through the remainder of reaction zone 262 and into the rapid separation zone 264 at the bottom portion of reactor/separator 260. Cracked and uncracked hydrocarbons are directed through a conduit or pipe 270 to a conventional product recovery section known in the art to yield fluidized catalytic cracking products light olefins, gasoline and cycle oil, with a maximized propylene yield. If necessary for temperature control, a quench injection can be provided near the bottom of reaction zone 262 immediately before the separation zone 264. This quench injection quickly reduces or stops the cracking reactions and can be utilized for controlling cracking severity.

The reaction temperature, i.e., the outlet temperature of the downflow reactor, can be controlled by opening and closing a catalyst slide valve (not shown) that controls the flow of regenerated catalyst from regeneration zone 266 into the top of reaction zone 262. The heat required for the endothermic cracking reaction is supplied by the regenerated catalyst. By changing the flow rate of the hot regenerated catalyst, the operating severity or cracking conditions can be controlled to produce the desired product slate. A stripper 272 is also provided for separating oil from the catalyst, which is transferred to regeneration zone 266. The catalyst from separation zone 264 flows to the lower section of the stripper 272 that includes a catalyst stripping section into which a suitable stripping gas, such as steam, is introduced through streamline 274. The stripping section is typically provided with several baffles or structured packing (not shown) over which the downwardly flowing catalyst 280 passes counter-currently to the flowing stripping gas. The upwardly flowing stripping gas, which is typically steam, is used to "strip" or remove any additional hydrocarbons that remain in the catalyst pores or between catalyst particles. The stripped or spent catalyst is transported by lift forces from the combustion air stream 276 through a lift riser of the regeneration zone 266. This spent catalyst, which can also be contacted with additional combustion air, undergoes controlled combustion of any accumulated coke. Flue gases are removed from the regenerator via conduit 278. In the regenerator, the heat produced from the combustion of the by-product coke is transferred to the catalyst raising the temperature required to provide heat for the endothermic cracking reaction in the reaction zone 262. According to the process herein, since the light solvent feedstock is combined with the heavy feedstock as the feed 236, the solvent to oil ratio in the initial solvent deasphalting/demetallizing process is selected so as to provide sufficient coking of the catalyst to provide the heat balance during regeneration.

Important properties of downflow reactors include introduction of feed at the top of the reactor with downward flow, shorter residence time as compared to riser reactors, and high catalyst to oil ratio, e.g., in the range of about 20:1 to about 30:1. In general, the operating conditions for the reactor of a suitable propylene production downflow FCC unit include: a reaction temperature of 550° C. 650° C., in certain embodiments 580° C. to 630° C., and in further embodiments 590° C. to 620° C.; a reaction pressure of 1 kg/cm² to 20 kg/cm², in certain embodiments of 1 kg/cm² to 10 kg/cm², in further embodiments of about 1 kg/cm² to about 3 kg/cm²; a contact time (in the reactor) of 0.1 seconds to 30 seconds, in certain embodiments 0.1 seconds to 10 seconds, and in further embodiments 0.2 seconds to 0.7 seconds; and a catalyst to feed ratio of 1:1 to 40:1, in certain embodiments 1:1 to 30:1, and in further embodiments 10:1 to 30:1.

In the interest of clarity, in the foregoing descriptions of the FCC units, the numerous valves, temperature sensors, electronic process controllers and other instrumentation that are customarily employed, and that are well known to those of ordinary skill in the art of solvent deasphalting/demetallizing and fluidized catalyst cracking, are not included in the attached schematic illustration. Accessory systems that are utilized in conventional fluidized catalyst cracking systems such as, for example, air supply, catalyst hoppers, torch oil supply, flue gas handling and heat recovery, fresh and spent catalyst hoppers for storage of make-up and used/equilibrium catalyst that can be added to, or removed from the regenerator, are not shown.

EXAMPLES

The embodiments described in this disclosure will be better understood by reference to the following examples, which are offered by way of illustration and which one skilled in the art will recognize are not meant to be limiting.

An unconverted hydrocracking bottoms stream, properties and composition of which are shown in Table 1, was catalytically cracked in a MAT (micro activity test) unit under identical conditions at 550° C., 30 seconds residence time, and catalyst-to-oil ratio of 4:1 using three different catalyst systems as bases for comparison. As Example 1 (comparative), the catalyst system included a (Ti,Zr)-USY zeolite catalyst and no catalyst additive. As Example 2, the catalyst system included a (Ti,Zr)-*BEA as the only zeolite catalyst with no additional additive. As Example 3, the catalyst system was a mixture of the (Ti,Zr)-USY zeolite catalyst of Example 1 and the (Ti,Zr)-*BEA zeolite of Example 2 as a catalyst additive, in which the weight ratio of (Ti,Zr)-USY to (Ti,Zr)-*BEA was 9:1. The results of the three experiments are provided in Table 2.

TABLE 1

| Properties and composition of unconverted bottoms stream | |
|---|---|
| Unconverted Bottoms Stream | |
| Density | 0.8164 kg/L |
| Sulfur | 70 ppmw |
| Nitrogen | <1 ppmw |
| Hydrogen | 15.25 wt. % |
| Simulated Distillation | |
| Fraction | Temperature |
| 0 wt. % | 324° C. |
| 5 wt. % | 689° C. |
| 10 wt. % | 731° C. |
| 30 wt. % | 788° C. |
| 50 wt. % | 831° C. |
| 70 wt. % | 886° C. |
| 90 wt. % | 965° C. |
| 95 wt. % | 994° C. |
| 100 wt. % | 1048° C. |

TABLE 2

Cracked compositions produced by from different catalyst systems

| Test Catalyst System Effluent Component | Example 1 (Comparative) (Ti,Zr)-USY Only | Example 2 (Ti,Zr)-*BEA Only | Example 3 (Ti,Zr)-USY + (Ti,Zr)-*BEA |
|---|---|---|---|
| | Weight percent of total | | |
| Hydrogen | 0.51 | 0.49 | 0.11 |
| Methane | 2.97 | 2.87 | 0.74 |
| Ethane | 2.92 | 2.83 | 0.77 |
| Ethylene | 3.44 | 3.33 | 2.88 |
| Propane | 35.22 | 34.10 | 8.59 |
| Propylene | 2.65 | 2.56 | 11.00 |
| iso-butane | 12.62 | 12.21 | 18.79 |
| n-butane | 8.94 | 8.65 | 4.99 |
| trans-2-butene | 0.32 | 0.31 | 1.98 |
| 1-butene | 0.23 | 0.23 | 1.53 |
| iso-butene | 0.55 | 0.53 | 3.15 |
| cis-2-butene | 0.28 | 0.27 | 1.62 |
| 1,3-butadiene | 0.05 | 0.05 | 0.21 |
| Liquid butenes | 0.06 | 0.01 | 0.66 |
| Gasoline | 18.49 | 10.84 | 31.88 |
| Light Cycle Oil | 4.59 | 1.59 | 5.33 |
| Heavy Cycle Oil | 1.45 | 0.57 | 1.09 |
| Coke | 4.72 | 18.55 | 4.69 |
| TOTAL | 100.01 | 99.99 | 100.01 |

Example 1 demonstrated the performance of a common FCC catalyst optimized for maximum propylene yield. From the (Ti,Zr)-USY zeolite catalyst alone, the propylene yield was 2.65 wt. %. Example 2 demonstrated the performance of the (Ti,Zr)-*BEA zeolite according to embodiments of this disclosure as a sole catalytic zeolite. The (Ti,Zr)-*BEA zeolite propylene yield was 2.56 wt. %, nearly identical to that of the conventional (Ti,Zr)-USY zeolite catalyst. Example 3 demonstrated a synergistic combination of the conventional (Ti,Zr)-USY catalyst and the (Ti,Zr)-*BEA zeolite as a catalyst additive, exhibiting a four-fold increase of propylene yield to 11 wt. %. Thus, it is believed that the (Ti,Zr)-*BEA zeolite according to embodiments of this disclosure, in addition to being an acceptable catalyst by itself, produces especially promising propylene yields when included with conventional FCC catalysts.

Items Listing

Embodiments of the present disclosure include at least following items, which are not intended to limit the scope of the disclosure as a whole or the appended claims.

Item 1: A method for cracking a hydrocarbon oil, the method comprising: contacting the hydrocarbon oil with a catalyst system in a fluidized catalytic cracking unit to produce light olefins and gasoline fuel, wherein: the catalyst system comprises FCC base catalyst and a catalyst additive; the FCC base catalyst comprises a Y-zeolite; the catalyst additive comprises a framework-substituted *BEA-type zeolite; and the framework-substituted *BEA-type zeolite has a modified *BEA framework, the modified *BEA framework comprising a *BEA aluminosilicate framework modified by substituting a portion of framework aluminum atoms of the *BEA aluminosilicate framework with beta-zeolite Al-substitution atoms independently selected from the group consisting of titanium atoms, zirconium atoms, and hafnium atoms.

Item 2: The method of Item 1, wherein the framework-substituted *BEA-type zeolite contains from 0.01% to 5% beta-zeolite Al-substitution atoms, as calculated on an oxide basis, based on the total mass of the framework-substituted *BEA-type zeolite.

Item 3: The method of Item 1 or Item 2, wherein: the framework-substituted *BEA-type zeolite contains from 0.01% to 5% by mass substitution atoms, as calculated on an oxide basis, based on the total mass of the framework-substituted *BEA-type zeolite; and the beta-zeolite Al-substitution atoms comprise a combination selected from the group consisting of (a) titanium atoms and zirconium atoms, (b) titanium atoms and hafnium atoms, (c) zirconium atoms and hafnium atoms, and (d) titanium atoms, zirconium atoms, and hafnium atoms.

Item 4: The method of any of Items 1 to 3, wherein: the framework-substituted *BEA-type zeolite contains from 0.01% to 5% beta-zeolite Al-substitution atoms, as calculated on an oxide basis, based on the total mass of the framework-substituted *BEA-type zeolite; and the beta-zeolite Al-substitution atoms comprise titanium atoms and zirconium atoms.

Item 5: The method of any of Items 1 to 4, wherein the framework-substituted *BEA-type zeolite has: (a) a specific surface area of 400 m$^2$/g to 800 m$^2$/g; (b) a molar ratio of $SiO_2$ to $Al_2O_3$ from 10 to 200; (c) a pore volume from 0.2 cm$^3$/g to 0.6 cm$^3$/g; and (d) crystal lattice constants a=1.260 nm to 1.270 nm, b=1.260 nm to 1.270 nm, and c=2.620 to 2.650 nm.

Item 6: The method of any of Items 1 to 5, wherein a weight ratio of the FCC base catalyst to catalyst additive in the catalyst system is from 2:1 to 1,000:1, based on the combined weight of the FCC base catalyst and the catalyst additive.

Item 7: The method of any of Items 1 to 6, wherein the weight ratio of the FCC base catalyst to catalyst additive in the catalyst system is from 4:1 to 100:1, based on the combined weight of the FCC base catalyst and the catalyst additive.

Item 8: The method any of Items 1 to 7, wherein the weight ratio of the FCC base catalyst to catalyst additive in the catalyst system is from 6:1 to 20:1, based on the combined weight of the FCC base catalyst and the catalyst additive.

Item 9: The method of any of Items 1 to 8, wherein the catalyst system comprises the FCC base catalyst, the catalyst additive, a catalyst matrix support, a binder, and a filler.

Item 10: The method of Item 9, wherein: the catalyst matrix support comprises alumina or silica-alumina; the binder is sol of a porous inorganic oxide selected from the group consisting of alumina, silica, boria, chromia, magnesia, zirconia, titania, silica-alumina, and combinations thereof; and the filler is a clay selected from the group consisting of kaolin, montmorillonite, halloysite, bentonite, and combinations thereof.

Item 11: The method of Item 9 or Item 10, wherein the catalyst system comprises, based on the total weight of the catalyst system: from 1% to 50% by weight FCC base catalyst; from 1% to 50% by weight catalyst additive; from 0.1% to 15% by weight binder; and from 0.1% to 15% by weight clay.

Item 12: The method of any of Items 1 to 11, wherein a weight ratio of the FCC base catalyst to catalyst additive in the catalyst system is from 6:1 to 20:1, based on the combined weight of the FCC base catalyst and the catalyst additive.

Item 13: The method of any of Items 1 to 12, wherein the framework-substituted *BEA-type zeolite has mesopores having diameters from 2 nm to 100 nm.

Item 14: The method of any of Items 1 to 13, wherein the Y-zeolite comprises an ultra-stable Y-zeolite or a framework-substituted ultra-stable Y-zeolite.

Item 15: The method any of Items 1 to 14, wherein: the FCC base catalyst comprises a framework-substituted ultra-stable Y (USY)-zeolite; and the framework-substituted USY-zeolite has a modified USY framework, the modified USY framework comprising a USY aluminosilicate framework modified by substituting a portion of framework aluminum atoms of the USY aluminosilicate framework with USY-zeolite Al-substitution atoms independently selected from the group consisting of titanium atoms, zirconium atoms, hafnium atoms, and combinations thereof.

Item 16: The method of Item 14 or Item 15, wherein the framework-substituted ultra-stable Y-zeolite contains from 0.01% to 5% USY-zeolite Al-substitution atoms, as calculated on an oxide basis, based on the total mass of the framework-substituted ultra-stable Y-zeolite.

Item 17: The method of any of Items 14 to 16, wherein the framework-substituted ultra-stable Y-type zeolite has: (a) crystal lattice constants a and b from 2.430 nm to 2.460 nm; (b) a specific surface area from 600 m$^2$/g to 900 m$^2$/g; and (c) a molar ratio of $SiO_2$ to $Al_2O_3$ from 5:1 to about 100:1.

Item 18: The method of any of Items 14 to 17, wherein: the framework-substituted *BEA-type zeolite contains from 0.01% to 5% beta-zeolite Al-substitution atoms, as calculated on an oxide basis, based on the total mass of the framework-substituted *BEA-type zeolite; the beta-zeolite Al-substitution atoms comprise titanium atoms and zirconium atoms; the framework-substituted ultra-stable Y-zeolite contains from 0.01% to 5% USY-zeolite Al-substitution atoms, as calculated on an oxide basis, based on the total mass of the framework-substituted ultra-stable Y-zeolite; and the USY-zeolite Al-substitution atoms comprise titanium atoms and zirconium atoms.

Item 19: The method of any of Items 1 to 18, wherein: the hydrocarbon oil comprises hydrocarbon components having a boiling point range greater than 350° C.; and the contacting occurs at a reaction temperature from 450° C. to 700° C., at a reaction pressure from 1 bar to 10 bar, with a residence or contact time from 0.1 seconds to 60 seconds, and with a catalyst to oil ratio from about 2:1 to 30:1.

Item 20: The method of any of Items 1 to 19, wherein the fluidized catalytic cracking unit comprises a riser reactor or a downer reactor.

Item 21: The method of any of Items 1 to 20, wherein the framework-substituted beta type zeolite catalyst additive is a (Ti,Zr)-*BEA zeolite having (a) a specific surface area of 400 m$^2$/g to 800 m$^2$/g; (b) a molar ratio of $SiO_2$ to $Al_2O_3$ of 10 to 200; and (c) crystal lattice constants a=1.26 nm to 1.27 nm, b=1.26 nm to 1.27 nm, and c=2.62 nm to 2.65 nm.

Item 22: The method of any of Items 1 to 20, wherein the framework-substituted *BEA-type zeolite catalyst additive is a (Ti,Zr)-*BEA zeolite having (a) a specific surface area of 400 m$^2$/g to 800 m$^2$/g; (b) a molar ratio of $SiO_2$ to $Al_2O_3$ of 50 to 60; (c) a pore volume from 0.38 cm$^3$/g to 0.43 cm$^3$/g; and (d) crystal lattice constants a=1.26 nm to 1.27 nm, b=1.26 nm to 1.27 nm, and c=2.62 nm to 2.65 nm.

Item 23: The method of any of Items 1 to 22, wherein the catalyst system further comprises an active metal component comprising iron, cobalt, nickel, rhodium, palladium, silver, iridium, platinum, gold, chromium, molybdenum, or tungsten.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

For the purposes of describing and defining the present disclosure it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for cracking a hydrocarbon oil, the method comprising:
    contacting the hydrocarbon oil with a catalyst system in a fluidized catalytic cracking unit to produce light olefins and gasoline fuel,
wherein:
    the catalyst system comprises FCC base catalyst and a catalyst additive;
    the FCC base catalyst comprises a Y-zeolite;
    the catalyst additive comprises a framework-substituted *BEA-type zeolite; and
    the framework-substituted *BEA-type zeolite has a modified *BEA framework, the modified *BEA framework comprising a *BEA aluminosilicate framework modified by substituting a portion of framework aluminum atoms of the *BEA aluminosilicate framework with beta-zeolite Al-substitution atoms independently selected from the group consisting of titanium atoms, zirconium atoms, hafnium atoms, and combinations thereof.

2. The method of claim 1, wherein the framework-substituted *BEA-type zeolite contains from 0.01% to 5% beta-zeolite Al-substitution atoms, as calculated on an oxide basis, based on the total mass of the framework-substituted *BEA-type zeolite.

3. The method of claim 1, wherein:
    the framework-substituted *BEA-type zeolite contains from 0.01% to 5% by mass substitution atoms, as calculated on an oxide basis, based on the total mass of the framework-substituted *BEA-type zeolite; and
    the beta-zeolite Al-substitution atoms comprise a combination selected from the group consisting of (a) titanium atoms and zirconium atoms, (b) titanium atoms and hafnium atoms, (c) zirconium atoms and hafnium atoms, and (d) titanium atoms, zirconium atoms, and hafnium atoms.

4. The method of claim 1, wherein:
the framework-substituted *BEA-type zeolite contains from 0.01% to 5% beta-zeolite Al-substitution atoms, as calculated on an oxide basis, based on the total mass of the framework-substituted *BEA-type zeolite; and
the beta-zeolite Al-substitution atoms comprise titanium atoms and zirconium atoms.

5. The method of claim 1, wherein the framework-substituted *BEA-type zeolite has:
(a) a specific surface area of 400 m$^2$/g to 800 m$^2$/g;
(b) a molar ratio of SiO$_2$ to Al$_2$O$_3$ from 10 to 200;
(c) a pore volume from 0.2 cm$^3$/g to 0.6 cm$^3$/g; and
(d) crystal lattice constants a=1.260 nm to 1.270 nm, b=1.260 nm to 1.270 nm, and c=2.620 to 2.650 nm.

6. The method of claim 1, wherein a weight ratio of the FCC base catalyst to catalyst additive in the catalyst system is from 2:1 to 1,000:1, based on the combined weight of the FCC base catalyst and the catalyst additive.

7. The method of claim 6, wherein the weight ratio of the FCC base catalyst to catalyst additive in the catalyst system is from 4:1 to 100:1, based on the combined weight of the FCC base catalyst and the catalyst additive.

8. The method of claim 6, wherein the weight ratio of the FCC base catalyst to catalyst additive in the catalyst system is from 6:1 to 20:1, based on the combined weight of the FCC base catalyst and the catalyst additive.

9. The method of claim 1, wherein the catalyst system comprises the FCC base catalyst, the catalyst additive, a catalyst matrix support, a binder, and a filler.

10. The method of claim 9, wherein:
the catalyst matrix support comprises alumina or silica-alumina;
the binder is sol of a porous inorganic oxide selected from the group consisting of alumina, silica, boria, chromia, magnesia, zirconia, titania, silica-alumina, and combinations thereof; and
the filler is a clay selected from the group consisting of kaolin, montmorillonite, halloysite, bentonite, and combinations thereof.

11. The method of claim 10, wherein the catalyst system comprises, based on the total weight of the catalyst system:
from 1% to 50% by weight FCC base catalyst;
from 1% to 50% by weight catalyst additive;
from 0.1% to 15% by weight binder; and
from 0.1% to 15% by weight clay.

12. The method of claim 11, wherein a weight ratio of the FCC base catalyst to catalyst additive in the catalyst system is from 6:1 to 20:1, based on the combined weight of the FCC base catalyst and the catalyst additive.

13. The method of claim 1, wherein the framework-substituted *BEA-type zeolite has mesopores having diameters from 2 nm to 100 nm.

14. The method of claim 1, wherein the Y-zeolite comprises an ultra-stable Y-zeolite or a framework-substituted ultra-stable Y-zeolite.

15. The method of claim 1, wherein:
the FCC base catalyst comprises a framework-substituted ultra-stable Y (USY)-zeolite; and
the framework-substituted USY-zeolite has a modified USY framework, the modified USY framework comprising a USY aluminosilicate framework modified by substituting a portion of framework aluminum atoms of the USY aluminosilicate framework with USY-zeolite Al-substitution atoms independently selected from the group consisting of titanium atoms, zirconium atoms, hafnium atoms, and combinations thereof.

16. The method of claim 15, wherein the framework-substituted ultra-stable Y-zeolite contains from 0.01% to 5% USY-zeolite Al-substitution atoms, as calculated on an oxide basis, based on the total mass of the framework-substituted ultra-stable Y-zeolite.

17. The method of claim 16, wherein the framework-substituted ultra-stable Y-type zeolite has:
(a) crystal lattice constants a and b from 2.430 nm to 2.460 nm;
(b) a specific surface area from 600 m$^2$/g to 900 m$^2$/g; and
(c) a molar ratio of SiO$_2$ to Al$_2$O$_3$ from 5:1 to about 100:1.

18. The method of claim 15, wherein:
the framework-substituted *BEA-type zeolite contains from 0.01% to 5% beta-zeolite Al-substitution atoms, as calculated on an oxide basis, based on the total mass of the framework-substituted *BEA-type zeolite;
the beta-zeolite Al-substitution atoms comprise titanium atoms and zirconium atoms;
the framework-substituted ultra-stable Y-zeolite contains from 0.01% to 5% USY-zeolite Al-substitution atoms, as calculated on an oxide basis, based on the total mass of the framework-substituted ultra-stable Y-zeolite; and
the USY-zeolite Al-substitution atoms comprise titanium atoms and zirconium atoms.

19. The method of claim 1, wherein:
the hydrocarbon oil comprises hydrocarbon components having a boiling point range greater than 350° C.; and
the contacting occurs at a reaction temperature from 450° C. to 700° C., at a reaction pressure from 1 bar to 10 bar, with a residence or contact time from 0.1 seconds to 60 seconds, and with a catalyst to oil ratio from about 2:1 to 30:1.

20. The method of claim 1, wherein the fluidized catalytic cracking unit comprises a riser reactor or a downer reactor.

* * * * *

UNITED STATES PATENT AND TRADEMARK OFFICE
CERTIFICATE OF CORRECTION

PATENT NO. : 11,142,703 B1
APPLICATION NO. : 16/985588
DATED : October 12, 2021
INVENTOR(S) : Omer Refa Koseoglu et al.

It is certified that error appears in the above-identified patent and that said Letters Patent is hereby corrected as shown below:

On the Title Page

Item (71), applicant 2, city, delete "Kawasaki" and insert --Saiwai-ku, Kawasaki-shi--, therefor.

Item (73), assignee 2, city, delete "Kawasaki" and insert --Saiwai-ku, Kawasaki-shi--, therefor.

In the Specification

In Column 3, Line(s) 16, delete "(Sift)" and insert --(SiO$_2$)--, therefor.

Signed and Sealed this
Eighteenth Day of October, 2022

Katherine Kelly Vidal
*Director of the United States Patent and Trademark Office*